Jan. 12, 1960     A. J. HENQUET     2,921,234
POTENTIAL COMPARING SYSTEMS
Filed Nov. 30, 1951
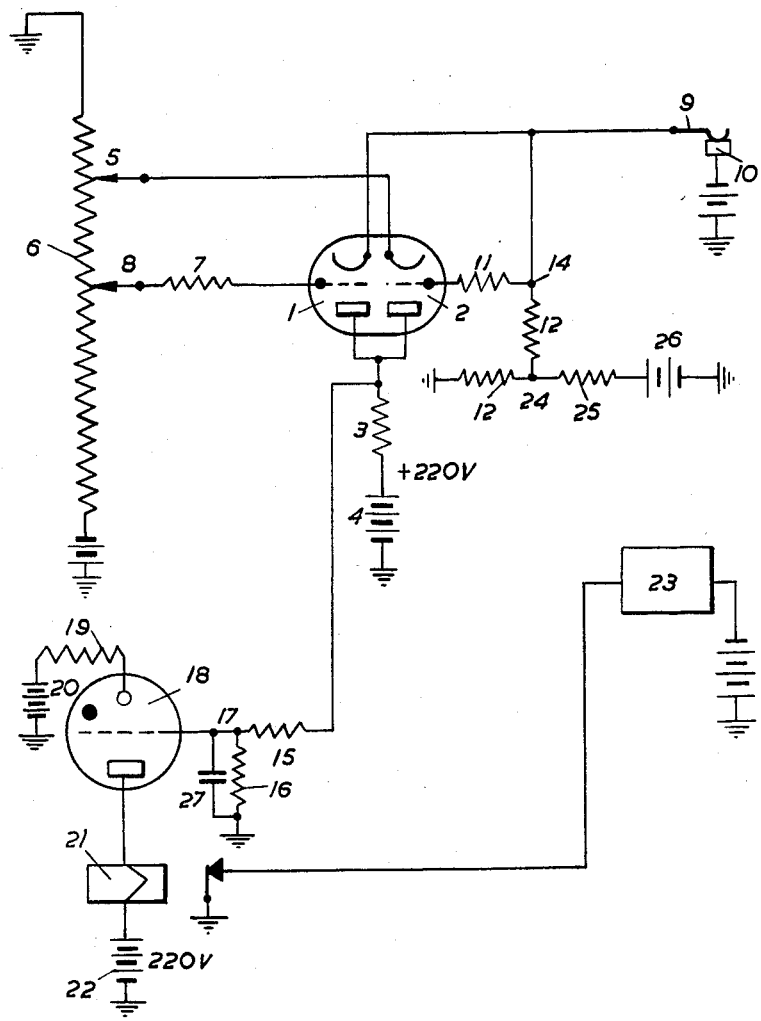
Inventor
A. J. HENQET
By Robert Harding
Attorney

United States Patent Office 2,921,234
Patented Jan. 12, 1960

2,921,234
POTENTIAL COMPARING SYSTEMS

Andre Jean Henquet, Boulogne-Billancourt, France, assignor to International Standard Electric Corporation, New York, N.Y., a corporation of Delaware Application November 30, 1951, Serial No. 259,026

Claims priority, application France December 8, 1950

5 Claims. (Cl. 315—163)

The present invention relates to potential comparing systems and more particularly to systems permitting determination of all the potentials included between two predetermined limits.

Potential detectors are known, for example, in automatic telephone systems with potential marking, which use two vacuum tubes such as triodes. In such devices, the grid of a triode is connected to the cathode of the other triode. We obtain thus two common points, each one at the two triodes. One of these points is brought to the potential required, the so-called reference potential, and the other is connected, for example, to the brush of a finder which scans terminals brought to different potentials. The two anodes of the two triodes are connected by a common resistance to the positive terminal of a high voltage battery. When the brush of the finder is in contact with a terminal brought to the reference potential the anodic current of the two triodes is nullified and the potential of the anodes rises up to the potential of the positive terminal of the high voltage battery. This potential variation of the anodes is used, for instance, in order to cause the triggering of a cold cathode tube the anodic current of which causes the operation of a relay which then stops the hunting of the finder. Such systems for comparing and detecting potentials permit only the determination of the equality of the potentials. In automatic telephone systems it is sometimes necessary to provide a device which will determine if a potential, for example the potential of a terminal of a finder, belongs to a potential area which is determined by the lower potential and the upper potential of the said area.

An object of the present invention is to provide a comparing system permitting either the determination of whether or not a potential belongs to an area of potentials or whether or not two potentials are equal and comprising only a reduced number of simple elements.

Another object of the invention is to provide a simple potential comparator giving the same security of operation whatever may be the boundaries of the area of potentials.

According to one of the features of the invention a potential comparing system comprises in combination two hot cathode vacuum tubes each one having at least one cathode, a grid and an anode, means for bringing the cathode of one of the tubes, so-called tube 1, to a predetermined potential, means for bringing the grid of the other tube, so-called tube 2, to another predetermined potential, a finder comprising at least a brush scanning terminals having predetermined potentials, means adapted for connecting the grid of tube 2 and the cathode of tube 1 to the brush of the said finder, a resistance connected between, on the one hand the two anodes of the said tubes, and on the other hand between the positive terminal of a high voltage battery, and means responsive to the variations of the potential difference at the terminals of the said resistance.

According to another feature of the invention, in such devices the difference between the potentials to which the cathode of tube 1 and the grid of tube 2 are brought is at least equal to twice the absolute value of the necessary potential difference between the grid and the cathode of one of the tubes for nullifying the anodic current of the said tube.

Other objects, features and advantages of the present invention will appear from a reading of the following description of an embodiment of the present invention, the said description being given in connection with the accompanying drawing representing the controlling circuit of an automatic telephone finder.

The circuit diagram shows two triodes 1 and 2 the anodes of which are connected by a common resistance 3 to the positive terminal of a 220 volts battery 4. The cathode of triode 2 is connected to the movable contact 5 of a potentiometer 6 and the grid of triode 1 is connected through a resistance 7 to the variable contact 8 of a potentiometer 6. The cathode of triode 1 is connected to a brush 9 scanning terminals, such as 10, having various potentials. The grid of triode 2 is connected by two resistances 11 and 12 to the point 24 of a potentiometer 25 connected between the positive terminal of the battery 26 and ground. The potential of 24 must be selected out of the range of potentials inside which the search is effected. In the particular embodiment under consideration the range of possible potentials is between 0 and —48 volts and the potentiometer 25 is so adjusted, that the potential of point 24 will be between 0 and 70 volts. In addition, point 14 is connected to the cathode of triode 1. The terminal of resistance 3 connected to the two anodes of the triodes 1 and 2 is connected to ground through a potentiometer comprising the resistances 15 and 16. The point 17 of the potentiometer is connected to the controlling electrode of a tube 18 which in the specific embodiment is a cold cathode tube the cathode of which is connected through a resistance 19 to the positive terminal of a 70 volts battery 20. The anode of tube 18 is connected through the winding of a relay 21 to the positive terminal of a 220 volts battery 22. It is assumed that terminals, such as 10, having a potential between V1 and V2, V1 being smaller than V2, are hunted for. In this connection, the movable contact 5 of the potentiometer 6 is adjusted so as to make the cathode potential of the triode 2 equal to $V2+U$, $U$ being the absolute value of the difference of potentials which it is necessary to maintain between the grid and the cathode of triode 2 so that the plate current may be nullified in the condition of operation, that is to say for the value of the difference of potentials between the cathode and the anode of this tube with respect to the given potential of the cathode. In the same way, the movable contact 8 of the potentiometer 6 is maintained at the potential $V1-U$. Under these conditions, if the terminal, such as 10, in contact with the brush 9, is at a potential higher than V2, the cathode of triode 1 will be highly positive with respect to the grid of the triode 1 and this triode is blocked; on the other hand the grid of triode 2 is at a potential sufficient for having the triode 2 conductive. Under these conditions, the anode current going through resistance 3 causes a voltage drop such that the potential of point 17 is not sufficient for making the tube 18 conductive. If the potential of terminal 10 in contact with brush 19 is lower than V1, triode 2 is blocked, and the potential of the grid of triode 1 being superior to the potential of the cathode, triode 1 is a conductive triode in view of the fact that its grid is maintained at potential $V1-U$; then it is the anodic current of triode 1 which causes the potential of point 17 to be maintained at a value not sufficient for rendering conductive tube 18. In the two cases, relay 21 does not operate and the clutching electro-magnet 23 which controls the scanning of terminals such as 10 by the brush 9 continues to cause the displacement of brush 9. When brush 9 comes into contact with a terminal 10, having a potential between V1 and V2, the two triodes are blocked. No current flows in resistance 3 and the two anodes of triodes 1 and 2 are brought to +220 volts. The point 17 is then brought to a potential sufficient for rendering tube 18 conductive. The anodic current of tube 18 causes the operation of relay 21 which by the opening of its rest contact causes the opening of the energizing circuit of the electro-magnet 23 which stops the hunting and maintains brush 9 in contact with the terminal which has been reached. When brush 9 is between two terminals, the grid of triode 2 and the cathode of triode 1 are brought to the potential of the point 24 of the potentiometer 25 which, as it has been stated, is outside the area of potentials which is being scanned. The movable contacts of the potentiometer 6 have been represented as contacts permitting continuous variation of the potentials of the grid of triode 1 or of the cathode of triode 2. Then it is possible to obtain an infinity of potentials areas. In practice the number of potential areas is limited and a certain number of predetermined taps is then provided along a potentiometer 6 and these points considered two by two determine the potential areas. The connection of the grid of triode 1 and of the cathode of triode 2, respectively, to two of those points is effected by means of switching members such as relays or step by step switches. The determination of the potentials of the taps on the potentiometer 6 varies on the one hand with the boundaries of the area inside which the hunting is effected and on the other hand with the potential difference which is to be established between the grid and the cathode of the tube for nullifying the plate current. Now this difference of potentials depends upon the difference of potentials between the cathode and the anode of the triodes, and as the potential of the cathode varies with the boundaries of the area it is possible to provide fixed taps on the potentiometer so as to take into consideration the variations in function of the difference of anode-cathode potentials which is to be maintained between the grid and the cathode of each triode for nullifying the anodic current. Thus, it is possible to obtain a great regularity of operation whatever may be the selected area, for example, between 0 and —48 volts.

The condenser 27, connected in parallel with resistance 16, permits, due to the time constant which it introduces, the avoidance of the operation of tube 18 when transient potential variations take place, for example at the time of the passage from one terminal to the other.

It is obvious that if the potentials V1 and V2 are equal to a potential V, the anodic current of two triodes is nullified when the potential of the terminal in contact with the brush 9 is equal to V.

While the principles of the invention have been described above in connection with specific embodiments and particular modifications thereof, it is to be clearly understood that the description is made only by way of example and not as a limitation on the scope of the invention.

What is claimed:

1. A potential comparing device for identifying potentials within a predetermined range comprising first and second electronic devices, each having an anode, a cathode, and a control electrode, a source of potential to be tested, means for connecting the cathode of said first device to the control electrode of said second device and to said source of potential to be tested, a second source of potential, a voltage divider circuit connected across said second source of potential, means for connecting the cathode of said second electronic device to a point on said voltage divider circuit having a predetermined relation to the most positive potential of said range, means for connecting the control electrode of said first electronic device to a different point on said voltage divider from that to which said cathode of said second electronic device is connected, said different point having a predetermined relation to the most negative potential of said range, and means including a source of potential connected in parallel to the anode of both devices and responsive only when there is no current flowing in either anode-cathode circuit.

2. A potential comparing device, as defined in claim 1, in which the means for connecting the cathode of the second electronic device to the voltage divider circuit includes means for adjusting the point of connection therewith, and in which the means for connecting the control electrode of the first electronic device to said voltage divider circuit include means for adjusting the point of contact therewith, whereby the range within which the test potential is to be identified may be altered within predetermined limits.

3. A potential comparing device, as defined in claim 1, further comprising means additionally connected to the control electrode of the second electronic device for maintaining current flow in said second device when the test potential is not connected to said control electrode.

4. A potential comparing device, as defined in claim 1, in which the means for responding when there is no current flowing in either anode-cathode circuit comprises a circuit common to both anodes including a resistance and a trigger device connected across said resistance and adapted to operate only when no current is flowing thereacross.

5. A potential comparing device, as defined in claim 4, in which the trigger device comprises a gas tube having a control electrode connected to the circuit common to both anodes of the electronic devices.

References Cited in the file of this patent

UNITED STATES PATENTS

| | | |
|---|---|---|
| 2,454,781 | Deakin | Nov. 30, 1948 |
| 2,476,389 | Schmidt | July 19, 1949 |
| 2,558,969 | LeCroy | July 3, 1951 |
| 2,559,601 | Deakin | July 10, 1951 |
| 2,566,420 | Keinath et al. | Sept. 4, 1951 |